US012771460B2

(12) United States Patent
Fukumoto et al.

(10) Patent No.: US 12,771,460 B2

(45) Date of Patent: Oct. 20, 2026

(54) COMMUNICATION APPARATUS AND ESTIMATION METHOD

(71) Applicant: NTT, Inc., Tokyo (JP)

(72) Inventors: Hiroyuki Fukumoto, Musashino (JP); Yosuke Fujino, Musashino (JP); Toshimitsu Tsubaki, Musashino (JP); Miharu Oiwa, Musashino (JP); Yuya Ito, Musashino (JP); Marina Nakano, Musashino (JP)

(73) Assignee: NTT, Inc., Tokyo (JP)

( * ) Notice: Subject to any disclaimer, the term of this patent is extended or adjusted under 35 U.S.C. 154(b) by 185 days.

(21) Appl. No.: 18/561,251

(22) PCT Filed: May 19, 2021

(86) PCT No.: PCT/JP2021/018989

§ 371 (c)(1),
(2) Date: Nov. 15, 2023

(87) PCT Pub. No.: WO2022/244141

PCT Pub. Date: Nov. 24, 2022

(65) Prior Publication Data

US 2024/0259113 A1 Aug. 1, 2024

(51) Int. Cl.
*H04B 11/00* (2006.01)
*H04B 13/02* (2006.01)

(52) U.S. Cl.
CPC ............ *H04B 11/00* (2013.01); *H04B 13/02* (2013.01)

(58) Field of Classification Search
CPC ... H04B 11/00; H04B 13/02; H04L 25/03006; H04L 25/0222; Y02D 30/70
(Continued)

(56) References Cited

U.S. PATENT DOCUMENTS 6,512,720 B1 1/2003 Yang
2009/0129204 A1* 5/2009 Zhou ...................... H04B 11/00 367/134

(Continued)

OTHER PUBLICATIONS

Bousquet et al. ( "Time-variant acoustic propagation characterization in seaport deployments." 2015 IEEE 28th Canadian Conference on Electrical and Computer Engineering (CCECE). IEEE, 2015.) (Year: 2015).*

(Continued)

*Primary Examiner* — Yuqing Xiao
*Assistant Examiner* — Christopher Richard Walker

(57) ABSTRACT

According to an aspect of the present invention, there is provided a communication apparatus including: a synchronizer configured to perform synchronization processing according to a Doppler shift on a reception signal; and an equalizer configured to perform equalization processing on a reception signal on which the synchronization processing has been performed, in which the synchronizer includes a correlator configured to output a correlation between a reception signal and a known preamble sequence and a correlation between the reception signal and a known postamble sequence, a slide correlator configured to output a sliding correlation based on an output of the correlator, and a Doppler estimator configured to estimate a Doppler shift based on the sliding correlation of the slide correlator.

3 Claims, 17 Drawing Sheets

(58) Field of Classification Search
USPC .......................................................... 367/131
See application file for complete search history.

(56) References Cited

U.S. PATENT DOCUMENTS

| | | | | |
|---|---|---|---|---|
| 2011/0013487 | A1* | 1/2011 | Zhou | H04B 11/00 367/134 |
| 2014/0133599 | A1* | 5/2014 | Ouchi | H04B 7/0469 375/295 |
| 2021/0099329 | A1* | 4/2021 | Hellfajer | H04L 27/2657 |
| 2021/0243054 | A1* | 8/2021 | Oishi | G01S 5/12 |

OTHER PUBLICATIONS

Liu et al. ("An adaptive multi-mode underwater acoustic communication system using OSDM and direct sequence spread spectrum modulation." IEEE Access 9 (2021): 56277-56291.) (Year: 2021).*
Tadayon et al. ("Frequency offset compensation for acoustic OFDM systems." Oceans 2017—Anchorage. IEEE, 2017., "Tadayon") (Year: 2017).*
Mark Johnson et al., Improved Doppler Tracking and Correction for Underwater Acoustic Communications, 1997 IEEE, vol. 1, 1997, pp. 575-578.
Bayan S. Sharif et al., A Computationally Efficient Doppler Compensation System for Underwater Acoustic Communications, 2000 IEEE, vol. 25, No. 1, Jan. 2000, pp. 52-61.
Milica Stojanovic et al., Underwater Acoustic Communication Channels: Propagation Models and Statistical Characterization, 2009 IEEE, vol. 47, No. 1, Jan. 2009, pp. 84-89.
Aval Yashar M et al: "Differentially Coherent Multichannel Detection of Acoustic OFDM Signals", IEEE Journal of Oceanic Engineering, IEEE Service Center, Piscataway, NJ, US, vol. 40, No. 2, Apr. 1, 2015 (Apr. 1, 2015), pp. 251-268, XP011578210, ISSN: 0364-9059, DOI: 10.1109/JOE.2014.2328411 [retrieved on Apr. 10, 2015].
Li Ming et al: "A novel Doppler frequency shift compensation algorithm for OFDM underwater acoustic communication system", Control and Decision Conference (CCDC), 2013 25th Chinese, IEEE, May 25, 2013 (May 25, 2013), pp. 1571-1575, XP032435146, DOI: 10.1109/CCDC.2013.6561179 ISBN: 978-1-4673-5533-9.

* cited by examiner

| PARAMETER | | VALUE |
|---|---|---|
| CENTER FREQUENCY | | 300kHz |
| BANDWIDTH | | 200kHz |
| MODULATION METHOD | | 8PSK |
| NUMBER OF STREAMS | | 1 |
| TRANSMISSION SPEED | | 600kbps (8PSK) |
| EQUALIZER | CONFIGURATION | DETERMINATION FEEDBACK TYPE EQUALIZER |
| | FILTER UPDATE | LMS |
| RECEPTION FILTER | | ROOT RAISED COSINE |

COMMUNICATION APPARATUS AND ESTIMATION METHOD

CROSS-REFERENCE TO RELATED APPLICATIONS

This application is a 371 U.S. National Phase of International Application No. PCT/JP2021/018989, filed on May 19, 2021. The entire disclosure of the above application is incorporated herein by reference.

TECHNICAL FIELD

The present invention relates to a technology of communication apparatus and an estimation method.

Background Art

In water, absorption and attenuation of radio waves are extremely large, and it is difficult to perform wireless communication using radio waves as on land. Therefore, sound waves of 1 MHz or less, which have relatively small absorption attenuation even in water, are often used for wireless communication. Such communication may be referred to as underwater acoustic communication. Since the propagation speed of sound waves is slow, a large Doppler shift may occur as the terminal moves. Furthermore, since the underwater environment is a multipath environment, multipaths with a Doppler shift may occur.

The Doppler shift causes a sampling timing shift. When the sampling timing shift is accumulated and the total amount of the sampling timing shift exceeds the time corresponding to one symbol, a burst error due to slip occurs. FIG. 14 is a diagram illustrating a specific example of burst errors due to slip. After the slip occurs, errors continue in the received data.

In underwater communication that is likely to be adversely affected by multipathing, an equalizer including a finite impulse response (FIR) filter therein may be used (for example, refer to Non Patent Literature 1). When the sampling timing shift occurs due to the Doppler shift as illustrated in FIG. 14, the coefficient of the FIR filter is offset from the optimum value in the time axis direction. Therefore, it is necessary to relearn the coefficient of the FIR filter to correct the sampling timing shift. However, even when relearning of the coefficient of the filter is performed for each symbol, the coefficient of the filter may diverge if the relearning of the filter is not in time, and waveform equalization may fail.

Therefore, in the underwater acoustic communication, a synchronization unit may be provided at the preceding stage of the input to the equalizer, and synchronization processing with respect to the Doppler shift may be performed (for example, refer to Non Patent Literature 1). If the equalizer is corrected in advance to a range in which the offset due to the Doppler shift can be tracked, the coefficient of the filter converges more easily. Therefore, the equalization processing can be stabilized.

FIG. 15 is a diagram illustrating functional blocks of a conventional synchronization unit. FIG. 15 particularly illustrates a configuration disclosed in Non Patent Literature 2 as an example. The synchronization unit 90 is provided at the preceding stage of an equalizer 99. The reception signal corrected in the synchronization unit 90 is input to the equalizer 99.

The synchronization unit 90 includes an estimation unit 91, a resampling unit 92, and a phase rotation unit 93. The estimation unit 91 estimates the Doppler shift amount. The resampling unit 92 corrects the sampling timing based on the estimated value of the estimation unit 91. The phase rotation unit 93 applies phase rotation to the reception signal based on the estimated value of the estimation unit 91. The frame of the reception signal includes a preamble unit and a postamble unit before and after the payload unit. Each of the preamble unit and the postamble unit has a signal of known preamble and postamble sequences in the apparatus on the reception side.

FIG. 16 is a diagram illustrating functional blocks of the conventional estimation unit 91. FIG. 16 particularly illustrates a configuration disclosed in Non Patent Literature 2 as an example. The estimation unit 91 includes a correlator 911, a preamble peak detection unit 912, a postamble peak detection unit 913, and a Doppler estimation unit 914. The correlator 911 calculates each of a correlation between the reception signal and the preamble sequence and a correlation between the reception signal and the postamble sequence, and estimates a delay profile before and after the frame.

FIG. 17 is a diagram illustrating an outline of processing of the conventional estimation unit 91. The preamble peak detection unit 912 detects the insertion position of the preamble from the peak (maximum value) position of the absolute value of the delay profile estimated in the preamble sequence. The postamble peak detection unit 913 detects the insertion position of the postamble from the peak (maximum value) position of the delay profile estimated in the postamble sequence. The Doppler estimation unit 914 calculates an elapsed time ($T_{rp}$) from the preamble start point to the postamble start point based on the information of the insertion position detected by the preamble peak detection unit 912 and the postamble peak detection unit 913. The Doppler estimation unit 914 estimates the Doppler shift by calculating the expansion/contraction ratio $T_{tp}/T_{rp}$ of the frame based on the transmission interval $T_{tp}$ from the head of the preamble unit to the head of the postamble unit at the time of transmission and the interval $T_{rp}$ at the time of reception.

CITATION LIST

Non Patent Literature

[Non Patent Literature 1] M. Johnson, L. Freitag and M. Stojanovic, "Improved Doppler tracking and correction for underwater acoustic communications,", 1997 IEEE International Conference on Acoustics, Speech, and Signal Processing, Munich, 1997, pp. 575-578 vol. 1, doi: 10.1109/ICASSP.1997.599703.

[Non Patent Literature 2] B. S. Sharif, J. Neasham, O. R. Hinton and A. E. Adams, "A computationally efficient Doppler compensation system for underwater acoustic communications," in IEEE Journal of Oceanic Engineering, vol. 25, no. 1, pp. 52-61, January 2000, doi: 10.1109/48.820736.

[Non Patent Literature 3] M. Stojanovic and J. Preisig, "Underwater acoustic communication channels: Propagation models and statistical characterization," in IEEE Communications Magazine, vol. 47, no. 1, pp. 84-89, January 2009, doi: 10.1109/MCOM.2009.4752682.

SUMMARY OF THE INVENTION

Technical Problem

However, in an underwater environment that is likely to be adversely affected by multipathing, estimation of the Doppler shift may fail. In water, the intensity of the multipath wave and the Doppler shift amount are likely to fluctuate in a short cycle due to fluctuation of the water surface or oscillation of the reception apparatus. Therefore, the absolute value of each path in the estimated delay profile is likely to be reversed (for example, refer to Non Patent Literature 3).

FIG. 18 is a diagram schematically illustrating such a reverse phenomenon. FIG. 18(A) is a diagram illustrating a specific example of a reception signal which is a processing target. FIG. 18(B) is a diagram illustrating a specific example of an estimation result in a situation not affected by multipathing. FIG. 18(C) is a diagram illustrating a specific example of an estimation result in a case where a reverse phenomenon occurs under the influence of multipathing. In FIG. 18(C), the multipath level of the direct wave is higher than the multipath level of the preamble, but the multipath level of the postamble is higher than the multipath level of the direct wave. When such a reverse phenomenon occurs, the path in which the peak is detected in the preamble unit does not coincide with the path in which the peak is detected in the postamble unit. When the same path is not detected, the Doppler shift is not correctly estimated. As a result, the accuracy of correction is degraded. Rather, as a result of applying erroneous correction to the reception signal, the sampling timing shift further increases, and equalization fails.

In view of the above circumstances, an object of the present invention is to provide a technology capable of increasing the accuracy of Doppler shift estimation in a multipath environment accompanied by a change in Doppler shift such as underwater.

Solution to Problem

According to an aspect of the present invention, there is provided a communication apparatus including: a synchronizer that performs synchronization processing according to a Doppler shift on a reception signal; and an equalization unit that performs equalization processing on a reception signal on which the synchronization processing has been performed, in which the synchronizer includes a correlator that outputs a correlation between a reception signal and a known preamble sequence and a correlation between the reception signal and a known postamble sequence, a slide correlator that outputs a sliding correlation based on an output of the correlator, and a Doppler estimation unit that estimates a Doppler shift based on the sliding correlation of the slide correlator.

According to another aspect of the present invention, there is provided a communication apparatus including: a synchronizer that performs synchronization processing according to a Doppler shift on a reception signal; and an equalization unit that performs equalization processing on a reception signal on which the synchronization processing has been performed, in which the synchronizer includes a synthetic correlator that calculates a first cross-correlation between the reception signal and a known preamble sequence and a second cross-correlation between the reception signal and a known postamble sequence, and outputs a sliding correlation between the first cross-correlation and the second cross-correlation, and a Doppler estimation unit that estimates a Doppler shift based on the sliding correlation of the synthetic correlator.

According to still another aspect of the present invention, there is provided an estimation method performed by a communication apparatus including a synchronizer that performs synchronization processing according to a Doppler shift on a reception signal, and an equalization unit that performs equalization processing on a reception signal on which the synchronization processing has been performed, the method including: a correlation step of outputting a correlation between a reception signal and a known preamble sequence and a correlation between the reception signal and a known postamble sequence; a slide correlation step of outputting a sliding correlation based on an output in the correlation step; and a Doppler estimation step of estimating a Doppler shift based on the sliding correlation in the slide correlation step.

According to still another aspect of the present invention, there is provided an estimation method performed by a communication apparatus including a synchronizer that performs synchronization processing according to a Doppler shift on a reception signal, and an equalization unit that performs equalization processing on a reception signal on which the synchronization processing has been performed, the method including: a synthetic correlation step of calculating a first cross-correlation between the reception signal and a known preamble sequence and a second cross-correlation between the reception signal and a known postamble sequence, and outputting a sliding correlation between the first cross-correlation and the second cross-correlation, and a Doppler estimation step of estimating a Doppler shift based on the sliding correlation in the synthetic correlation step.

Effects of the Invention

According to the present invention, it is possible to increase the accuracy of the estimation of the Doppler shift in a multipath environment accompanied by a change in the Doppler shift such as underwater.

DESCRIPTION OF EMBODIMENTS

[Principle of Technology]

First, the principle of the technology according to the present invention will be described. In the present invention, a correlation shift amount is calculated based on a slide correlation between a correlation result of a preamble and a correlation result of a postamble. Then, the Doppler shift is estimated based on the correlation shift amount.

Figure 1:
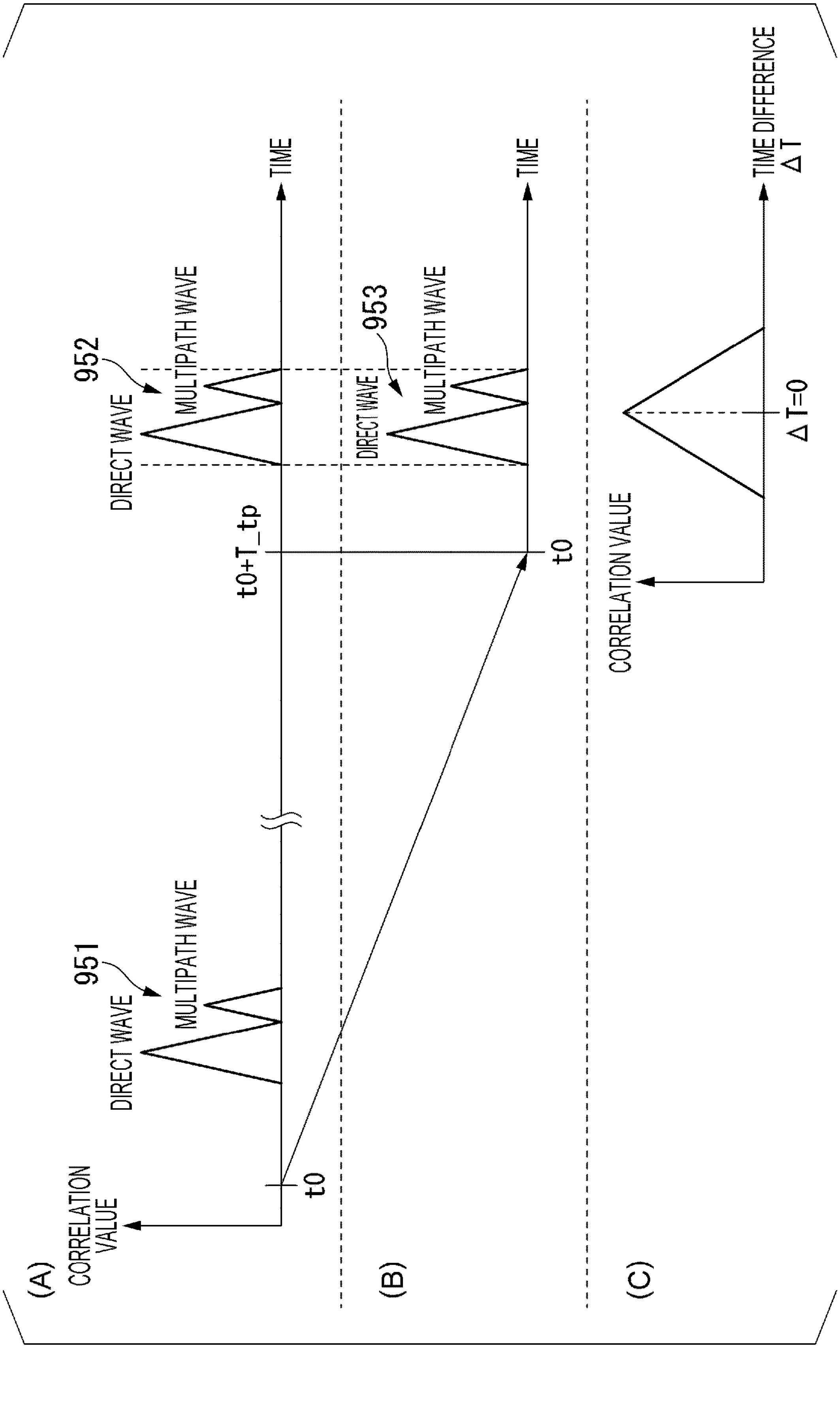
FIG. 1 is a diagram illustrating an output of a correlator 911 as a time series waveform.

The principle of the technology according to the present invention will be described in detail. FIG. 1(A) is a diagram illustrating an output of a correlator 911 included in a conventional estimation unit 91 as a time series waveform. Reference numeral 951 indicates an example of a delay profile estimated from the preamble sequence. Reference numeral 952 indicates an example of a delay profile estimated from the postamble sequence. t0 is any one point on the time axis. T_tp is a time (transmission interval) from the preamble head position to the postamble head position at the time of transmission.

FIG. 1(B) is a diagram in which the output after to of the correlator 911 is folded back and the time positions of the point t0+T_tp of the time series of FIG. 1(A) and the start point (t0) are aligned. In other words, FIG. 1(B) is a diagram illustrating a time series of the output of the correlator 911 of the T_tp offset. Reference numeral 953 indicates an example of a delay profile estimated from the preamble sequence. As can be seen from the comparison of the time series data in FIGS. 1(A) and 1(B) (dotted line in the drawing), in a case where there is no Doppler shift, the positions between the direct wave and the multipath wave coincide with each other. That is, the positional relationship between the direct wave and the multipath wave in the delay profile estimated from the preamble sequence coincides with the positional relationship between the direct wave and the multipath wave in the delay profile estimated from the postamble sequence. This is because the insertion interval between the preamble and the postamble is T_tp, and the insertion interval at the reception point is T_rp=T_tp.

FIG. 1(C) is a diagram illustrating a calculation result of the slide correlation of FIGS. 1(A) and 1(B). That is, FIG. 1(C) is a diagram illustrating slide correlation between a direct wave and a multipath wave in a delay profile estimated from a preamble sequence and a direct wave and a multipath wave in a delay profile estimated from a postamble sequence. In this case, a peak appears at a time difference $\Delta T=0$ between FIG. 1(A) and FIG. 1(B).

Figure 2:
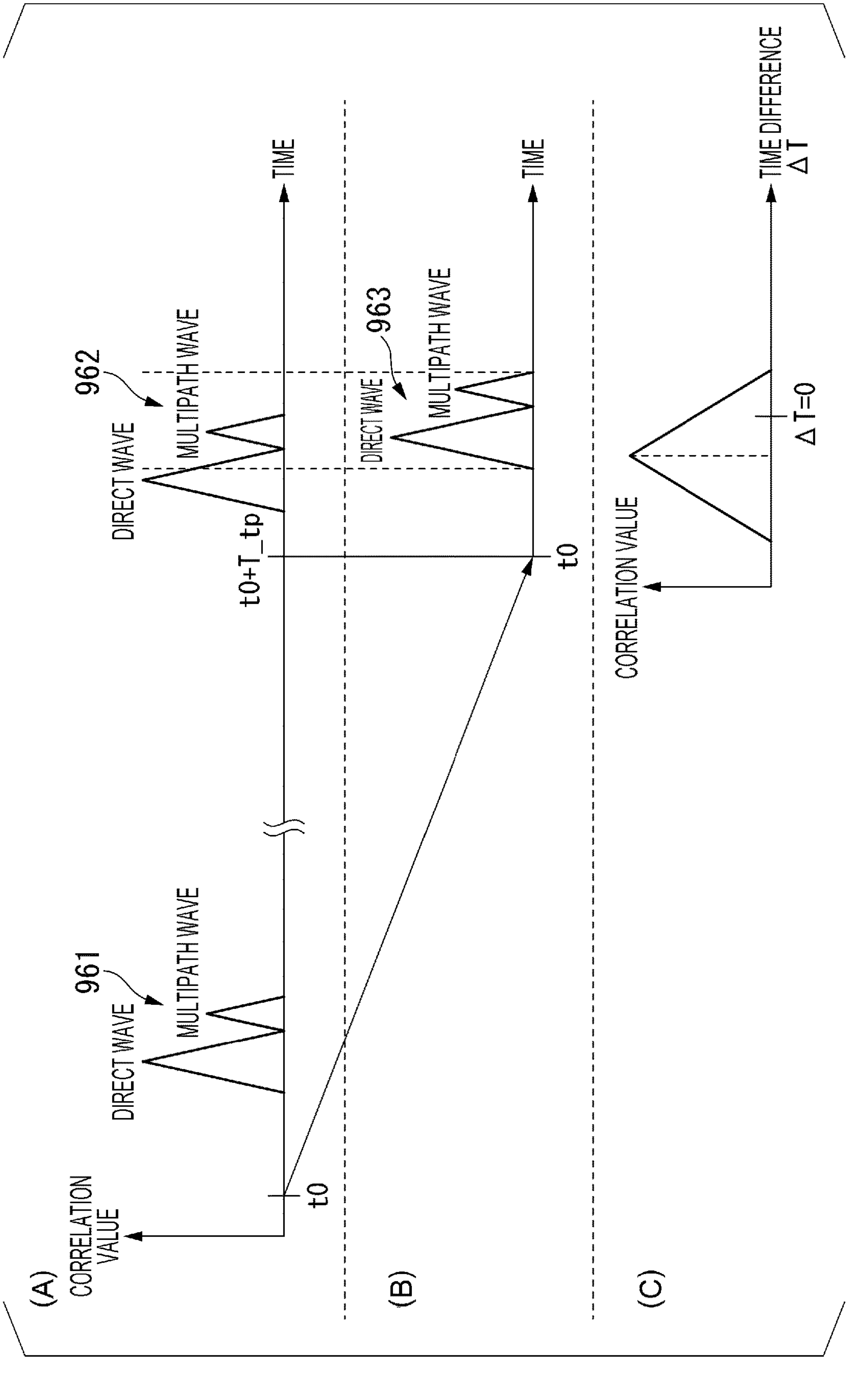
FIG. 2 is a diagram illustrating an output of the conventional correlator 911 as a time series waveform in a case where a Doppler shift acts in a + direction.

Next, a case where the Doppler shift acts in the + direction (approaching direction) will be described. In this case, an interval (insertion cycle T_rp) between the preamble and the postamble observed on the reception side is shorter than T_tp. FIG. 2(A) is a diagram illustrating an output of the conventional correlator 911 as a time series waveform in a case where a Doppler shift acts in the + direction. FIG. 2(B) is a diagram in which the time positions of the point t0+T_tp of the time series of FIG. 2(A) and the start point (t0) are aligned by folding back the output after to of the correlator 911 in a case where the Doppler shift acts in the + direction. In other words, FIG. 2(B) is a diagram illustrating a time series of the output of the correlator 911 of the T_tp offset. FIG. 2(C) is a diagram illustrating a calculation result of the slide correlation of FIGS. 2(A) and 2(B). Reference numerals 961 and 963 indicate examples of delay profiles estimated from the preamble sequence. Reference numeral 962 indicates an example of a delay profile estimated from the postamble sequence.

As is clear from the comparison between FIG. 2(A) and FIG. 2(B), the delay profile estimated from the postamble sequence is observed on the left side (relatively later) than the delay profile estimated from the preamble sequence. Therefore, the peak of the output of the slide correlation illustrated in FIG. 2(C) is shifted in the negative direction ($\Delta T<0$).

Figure 3:
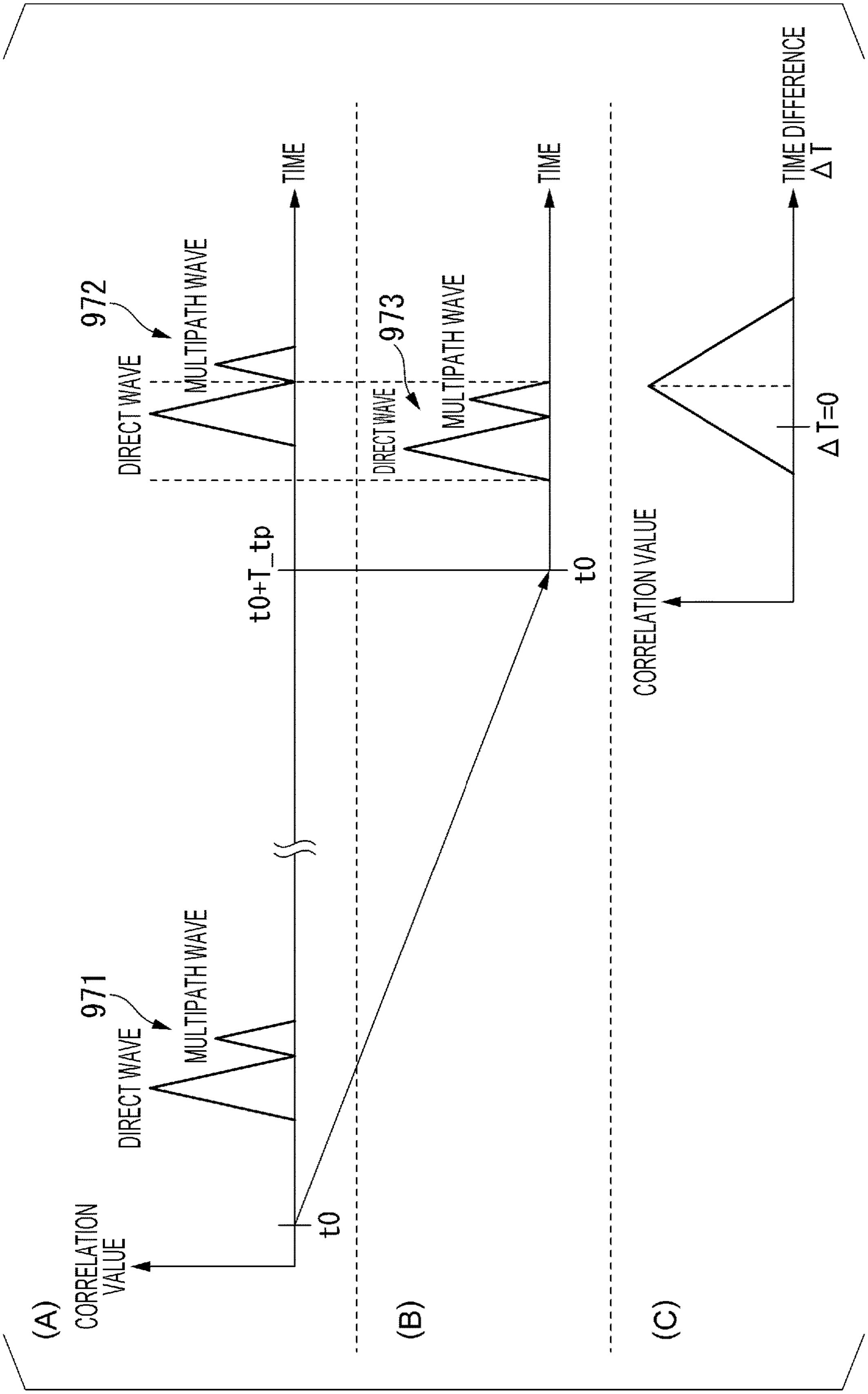
FIG. 3 is a diagram illustrating an output of the conventional correlator 911 as a time series waveform in a case where a Doppler shift acts in a − direction.

Next, a case where the Doppler shift acts in the − direction (direction in which the terminal moves away) will be described. In this case, an interval (insertion cycle T_rp) between the preamble and the postamble observed on the reception side is shorter than T_tp. FIG. 3(A) is a diagram illustrating an output of the conventional correlator 911 as a time series waveform in a case where the Doppler shift acts in a − direction. FIG. 3(B) is a diagram in which the time positions of the point t0+T_tp of the time series of FIG. 3(A) and the start point (t0) are aligned by folding back the output after to of the correlator 911 in a case where the Doppler shift acts in the − direction. In other words, FIG. 3(B) is a diagram illustrating a time series of the output of the correlator 911 of the T_tp offset. FIG. 3(C) is a diagram illustrating a calculation result of the slide correlation of FIGS. 3(A) and 3(B). Reference numerals 971 and 973 indicate examples of delay profiles estimated from the preamble sequence. Reference numeral 972 indicates an example of a delay profile estimated from the postamble sequence.

As is clear from the comparison between FIG. 3(A) and FIG. 3(B), the delay profile estimated from the postamble sequence is observed on the ⇒side (relatively advanced) than the delay profile estimated from the preamble sequence. Therefore, the peak of the output of the slide correlation illustrated in FIG. 3(C) is shifted in the positive direction ($\Delta T>0$).

In this manner, the magnitude of $\Delta T$ is proportional to the Doppler shift amount. Therefore, it is possible to estimate the Doppler shift amount by observing the shift of the section itself in which the preamble and the postamble are correlated with each other.

It should be noted that the slide correlation output in any of FIGS. 1(C) to 3(C) is unimodal. That is, the multipath influence (multimodal peak) seen at the output of the correlator 911 is eliminated. The output of the sliding correlation illustrated in FIGS. 1(C) to 3(C) is obtained as a result of the sliding correlation between the delay profile estimated in the preamble at the head of the frame and the delay profile estimated in the postamble at the rear end of the frame. According to the present approach of estimating the Doppler shift based on the peak (maximum value) of the absolute value of the sliding correlation, the influence is hardly received as long as the rough feature of the delay profile itself does not change. Compared with the conventional technology (for example, the technology of Non Patent Literature 2) in which Doppler estimation is performed at one correlation peak position point, the technology using the present approach in which planar estimation is performed with a correlation (degree of matching) including correlation values before and after a peak is more robust in estimation against multipath fluctuations. Hereinafter, a apparatus and a method for realizing Doppler estimation according to the present approach will be described.

Figure 4:
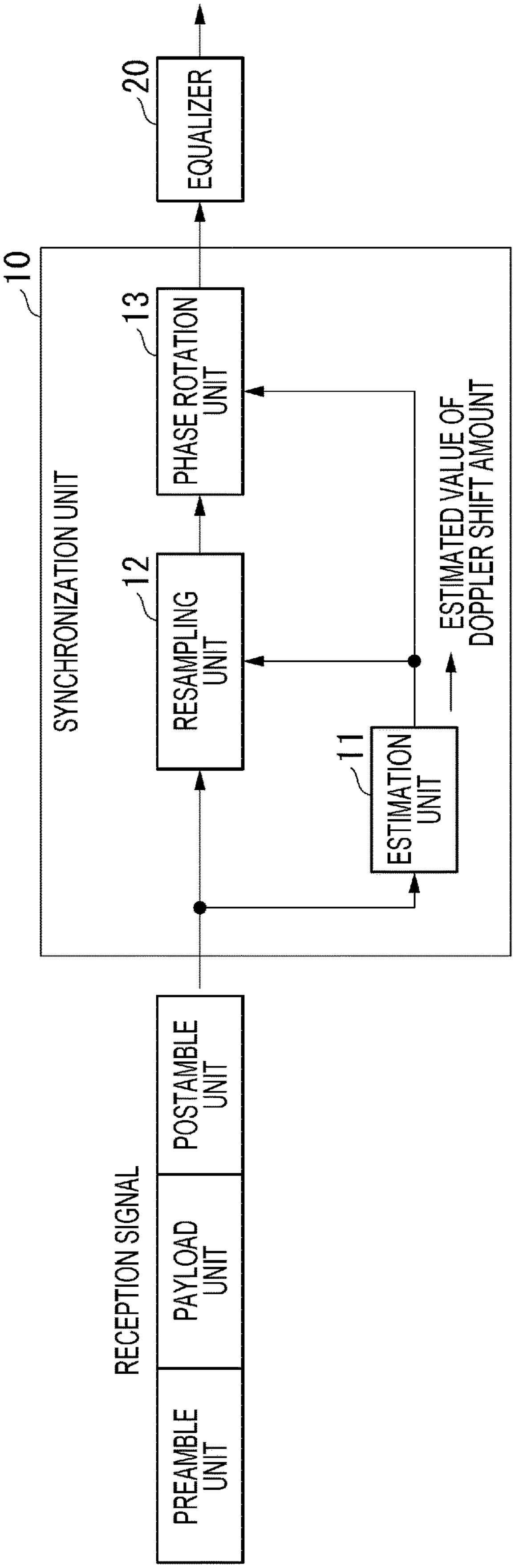
FIG. 4 is a diagram illustrating a configuration example of a synchronization unit 10 in the present invention.

FIG. 4 is a diagram illustrating a configuration example of a synchronization unit 10 in the present invention. The synchronization unit 10 receives the reception signal and outputs the corrected reception signal to an equalizer 20. The synchronization unit 10 includes an estimation unit 11, a resampling unit 12, and a phase rotation unit 13. The estimation unit 11 estimates the Doppler shift amount. The resampling unit 12 corrects the sampling timing based on the estimated value of the estimation unit 11. The phase rotation unit 13 applies phase rotation to the reception signal based on the estimated value of the estimation unit 11. Hereinafter, two configuration examples of the first embodiment and the second embodiment will be described for the configuration of the estimation unit 11 included in the synchronization unit 10. Note that, in the following description, the description of A_B indicates that characters "B" (character string) are described with a subscript on the right side of characters "A" (character string).

First Embodiment

Figure 5:
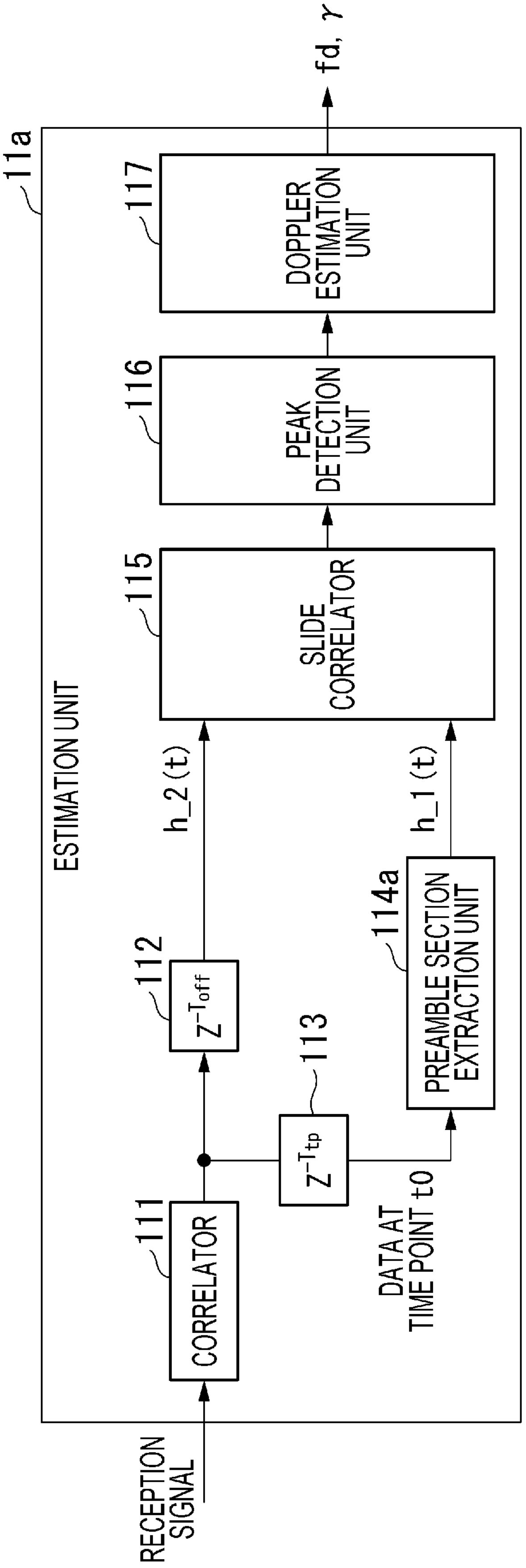
FIG. 5 is a diagram illustrating a functional configuration of the first embodiment (estimation unit 11*a*) of an estimation unit 11.
Figure 6:
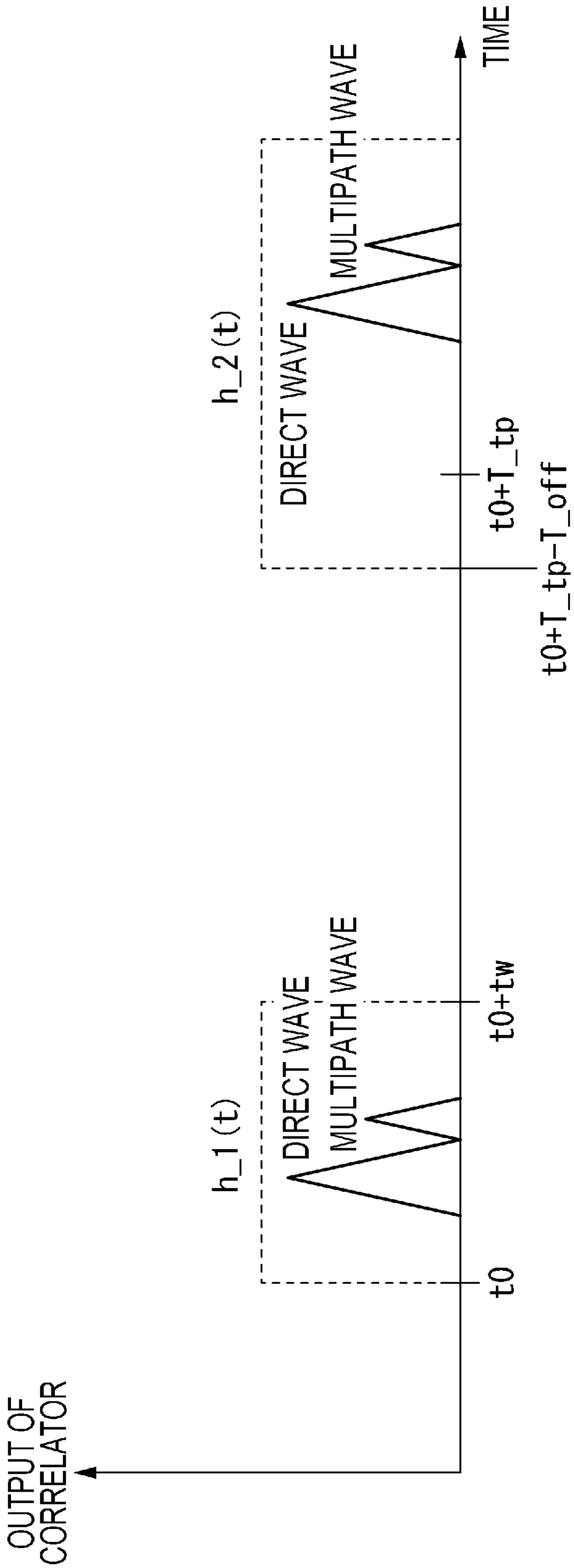
FIG. 6 is a diagram illustrating a specific example of a signal used in processing of the first embodiment (estimation unit 11*a*) of the estimation unit 11.

FIG. 5 is a diagram illustrating a functional configuration of the first embodiment (estimation unit 11*a*) of the estimation unit 11. FIG. 6 is a diagram illustrating a specific example of a signal used in processing of the first embodiment (estimation unit 11*a*) of the estimation unit 11. The estimation unit 11*a* includes a correlator 111, a first delay device 112, a second delay device 113, a preamble section extraction unit 114*a*, a slide correlator 115, a peak detection unit 116, and a Doppler estimation unit 117. The estimation unit 11*a* of the first embodiment configured as described above is a apparatus that simply realizes the above-described approach.

The correlator 111 performs correlation calculation between the signal sequence of the preamble and the signal sequence of the postamble and the reception signal. The data output from the correlator 111 to the slide correlator 115 is data having a time point t0+T_tp−T_off as a start point. The data output from the correlator 111 to the preamble section extraction unit 114*a* is data of which the time point to is a start point. The preamble section extraction unit 114*a* outputs output data h_1(*t*) of the correlator 111 from the time point t0 to the time point t0+tw. The slide correlator 115 calculates the correlation between h_1(*t*) and the correlated function h_2(*t*).

t0 is desirably set at a time point immediately before the preamble arrives. In order to realize such setting, for example, a power detector may be provided at the preceding stage of the synchronization unit 10. The power detector outputs an amplitude value (or an intensity value) of the reception signal. The start point setter estimates the start point of the reception signal based on the output of the power detector. Such estimation may be performed roughly. The start point setter may set the position of t0 from the estimated value. The start point setter may set the position of the start point (t0) by processing different from the above-described processing. For example, the start point setter may analogize the position of the start point (t0) from the head position of the previous data frame. tw represents a terminal point of a section which is an extraction target in the time series data output from the correlator 111. tw may be set based on a multipath delay profile of the propagation path. tw may be set to any point in advance by the user. Information of the output of the correlator 111 may be used to estimate the delay profile.

The delay amount T_off of the correlator output at the preceding stage of the input to the slide correlator 115 may be calculated from the waveform compression amount corresponding to the maximum Doppler frequency assumed by the system. The correlated function h_2(*t*) is time series data after t0+T_tp−T_off.

The slide correlator 115 performs calculation of the slide correlation illustrated in FIGS. 1(C) to 3(C). The slide correlator 115 calculates cross-correlation between the sequence h_1(*t*) of correlator outputs and the sequence h_2(*t*) of correlator outputs extracted by the preamble section extraction unit 114*a*. That is, the output y(t) of the slide correlator 115 is indicated by the following Formula 1.

[Math. 1]

$$y(t) = \int h_1(\tau) h_2^*(t-\tau) d\tau \qquad \text{(Formula 1)}$$

Here, * represents a complex conjugate. In addition, instead of Formula 1, correlation calculation may be performed only with the amplitude values of h_1(*t*) and h_2(*t*). This processing has an effect of reducing the influence of the phase noise of the correlator output. The following Formula 2 or 3 below may be used.

[Math. 2]

$$y(t) = \int |h_1(\tau)||h_2^*(t-\tau)| d\tau \qquad \text{(Formula 2)}$$

[Math. 3]

$$y(t) = \int |h_1(\tau)|^2 |h_2^*(t-\tau)|^2 d\tau \qquad \text{(Formula 3)}$$

Furthermore, the slide correlator 115 may calculate the moving average value of the correlator outputs h_1(*t*) and h_2(*t*) using a filter such as a CIC filter for the purpose of reducing the calculation amount.

The peak detection unit 116 calculates a time difference ΔT_max corresponding to a peak value from the output of the slide correlator 115. For example, the peak detection unit 116 may calculate the time difference ΔT_max using the following Formula 4.

[Math. 4]

$$\Delta T_{max} = \underset{t}{\mathrm{argmax}} |y(t)| \qquad \text{(Formula 4)}$$

The Doppler estimation unit 117 performs Doppler estimation (estimation of T_rp) using ΔT_max. The Doppler estimation unit 117 may calculate T_rp by using the following Formula 5, for example.

[Math. 5]

$$T_{rp} = (1 + \Delta T)T_{tp} \quad \text{(Formula 5)}$$

is satisfied. Here, ΔT is a relative time difference calculated by the slide correlator 115, and is expressed by the following Formula 6.

[Math. 6]

$$\Delta T = \Delta T_{max} - T_{off} \quad \text{(Formula 6)}$$

Furthermore, the Doppler estimation unit 117 calculates the estimated Doppler frequency f_d from T_rp using the following Formula 7.

[Math. 7]

$$f_d = \left(\frac{T_{tp}}{T_{rp}} - 1\right)f_c \quad \text{(Formula 7)}$$

Here, f_c is a carrier frequency. In addition, the expansion/contraction ratio (resample factor) of the waveform is calculated by the following Formula 8, and an estimated value is output.

[Math. 8]

$$\gamma = \frac{T_{tp}}{T_{rp}} \quad \text{(Formula 8)}$$

The resampling unit 12 and the phase rotation unit 13 included in the synchronization unit 10 perform correction based on fd and γ, respectively.

When the sampling rate is Ts, ΔT=N_t Ts is satisfied. In the case of being realized by a digital circuit, N_t is estimated.

Figure 7:
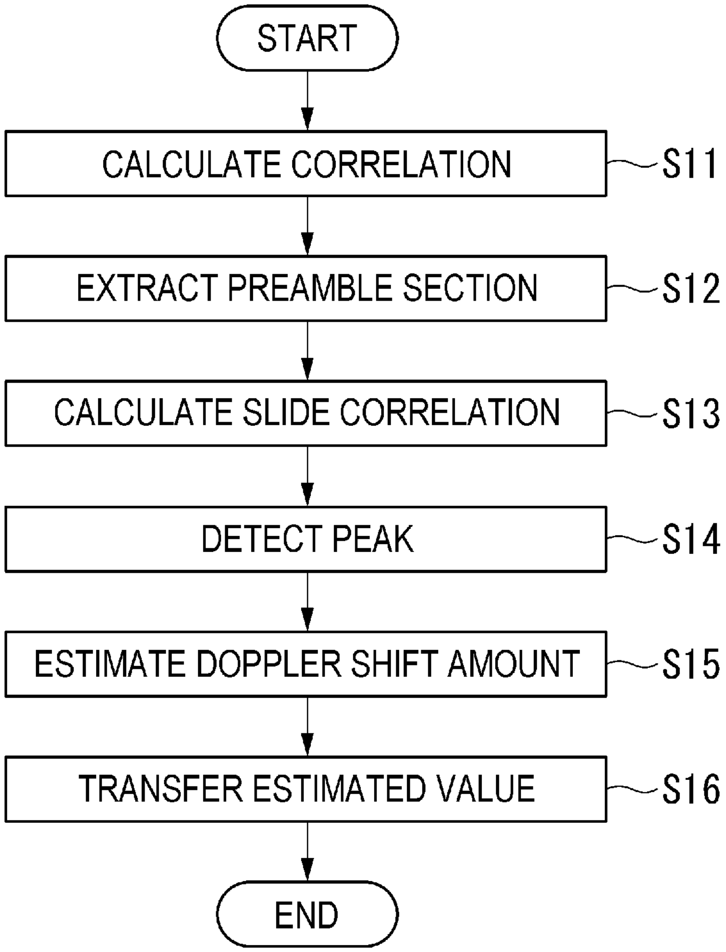
FIG. 7 is a flowchart illustrating a specific example of a processing flow of the estimation unit 11*a* of a first embodiment.

FIG. 7 is a flowchart illustrating a specific example of a processing flow of the estimation unit 11*a* of the first embodiment. Hereinafter, a specific example of processing of the estimation unit 11*a* of the first embodiment will be described with reference to FIG. 7. First, the correlator 111 performs cross-correlation calculation between the known signal of the preamble and the known signal of the postamble and the reception signal. The correlator 111 outputs a signal indicating a correlation result (step S11). The preamble section extraction unit 114*a* extracts the signal from the time point t0 to the time point t0+tw as the signal of the preamble section among the outputs of the correlation results in step S11 (step S12). The slide correlator 115 calculates a slide correlation between the output of the correlation result in step S11 and the signal in the preamble section extracted in step S12 (step S13).

The peak detection unit 116 detects the peak position T_max from the calculation result of the slide correlation (step S14). The Doppler estimation unit 117 estimates the Doppler shift amount (fd and Y) from the peak position T_max (step S15). The Doppler estimation unit 117 outputs the Doppler shift amount (fd and γ) which is the estimation result (step S16).

The estimation unit 11*a* configured as described above acquires the sliding correlation between the correlation value of the preamble and the correlation value of the postamble. A peak (maximum value) of the absolute value of the output of the sliding correlation is detected by the peak detection unit 116, and the Doppler estimation unit 117 estimates the Doppler shift based on the detection result. Therefore, it is possible to suppress the influence of the shift of the position of the peak itself to be small as compared with a case where the peak of the correlation of the preamble and the peak of the correlation of the postamble are simply obtained. That is, since ΔT is estimated by performing matching planarly with a correlation including correlation values before and after a peak, estimation becomes robust against multipath variation.

Second Embodiment

Figure 8:
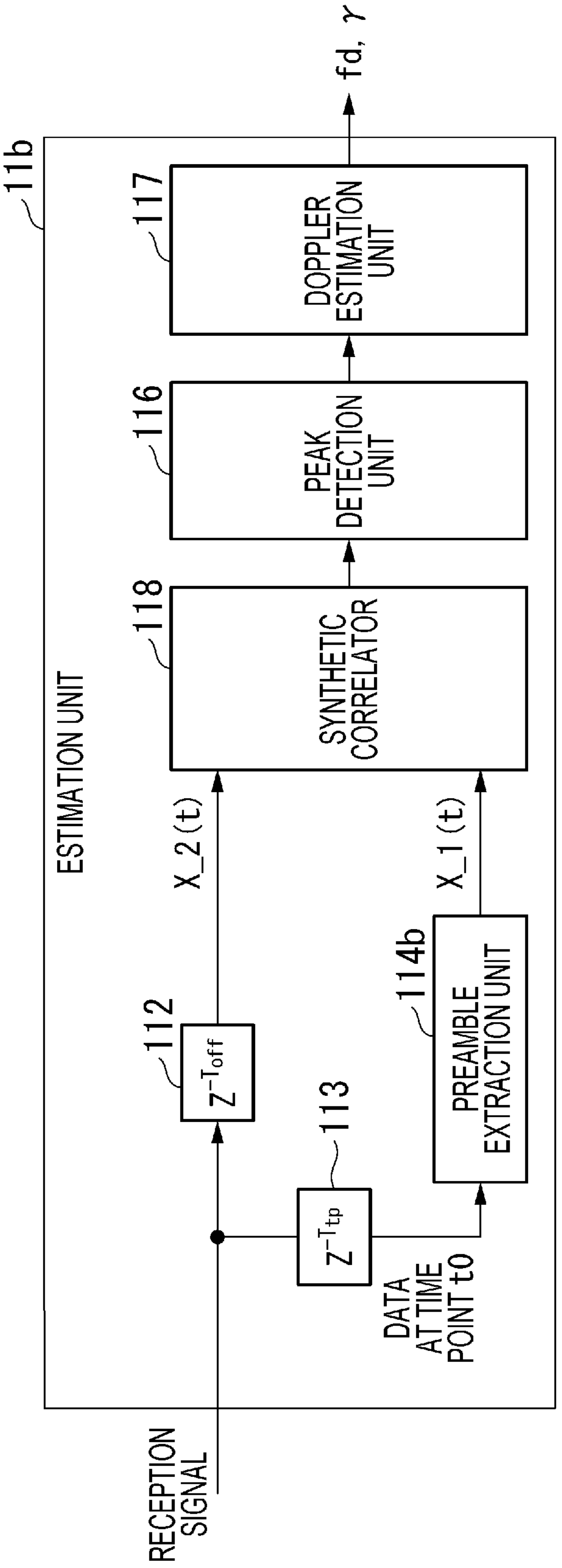
FIG. 8 is a diagram illustrating a functional configuration of a second embodiment (estimation unit 11*b*) of the estimation unit 11.
Figure 9:
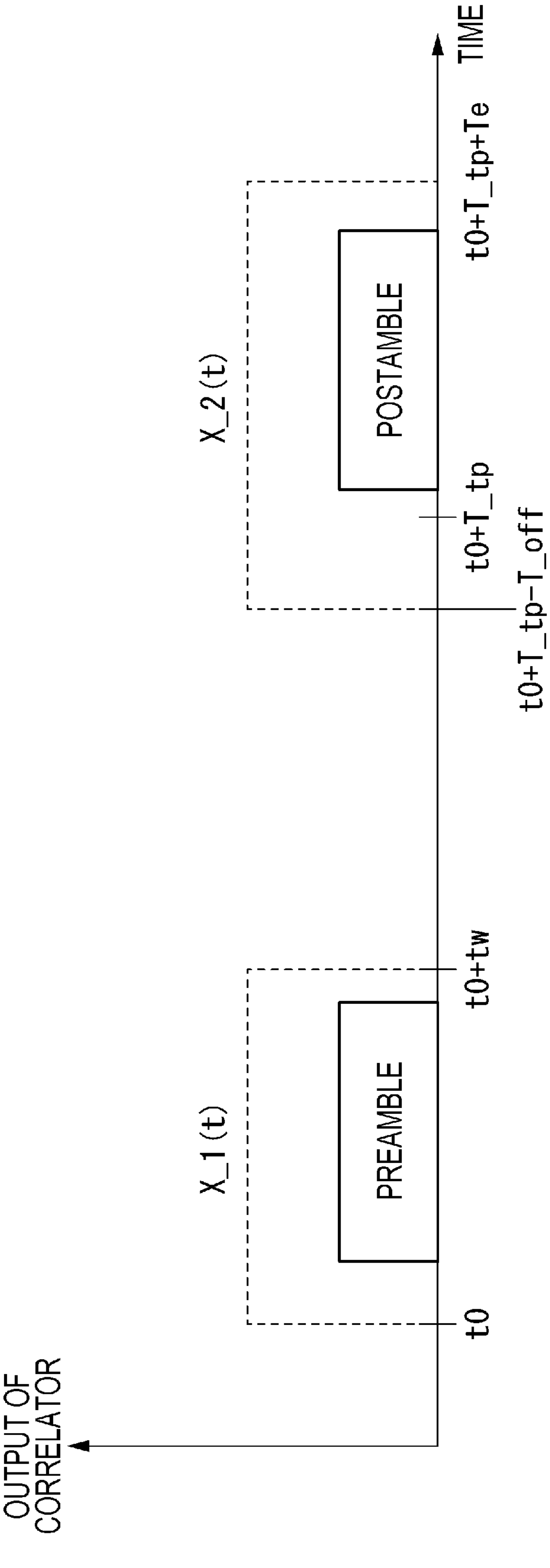
FIG. 9 is a diagram illustrating a specific example of a signal used in processing of the second embodiment (estimation unit 11*b*) of the estimation unit 11.

FIG. 8 is a diagram illustrating a functional configuration of the second embodiment (estimation unit 11*b*) of the estimation unit 11. FIG. 9 is a diagram illustrating a specific example of a signal used in processing of the second embodiment (estimation unit 11*b*) of the estimation unit 11. The estimation unit 11*b* includes the first delay device 112, the second delay device 113, a preamble section extraction unit 114*b*, a synthetic correlator 118, the peak detection unit 116, and the Doppler estimation unit 117. The estimation unit 11*b* of the second embodiment configured as described above can realize the calculation of the correlator and the slide correlator with a low calculation amount.

The preamble section extraction unit 114*b* roughly extracts a section including the preamble from the reception signal. For rough extraction of the preamble section, for example, a power detector may be provided at a preceding stage of the synchronization unit 10. The power detector outputs an amplitude value (or an intensity value) of the reception signal. The start point setter estimates the start point of the reception signal based on the output of the power detector. The start point setter may set the position of to from the estimated value. The start point setter may set the position of the start point (t0) by processing different from the above-described processing. For example, the start point setter may analogize the position of the start point (t0) from the head position of the previously reached data frame. The preamble section extraction unit 114*b* outputs the reception signal X_1(*t*) from the time point t0 to the time point t0+tw.

Furthermore, the reception signal X_2(*t*) of the correlated function in the synthetic correlator 118 may be roughly extracted from t=t0+T_tp−T_off to t=t0+T_tp+Te near the end point of the postamble. The extracted section Te may be determined by the system based on the length of the postamble sequence and the length of the delay profile of the propagation path. The section Te may be set to any section designated by the user.

The synthetic correlator 118 simultaneously performs the calculation of the correlator 111 and the convolution calculation of the slide correlator 115 in the first embodiment. For example, the synthetic correlator 118 may perform calculation of Formula 9 as follows.

[Math. 9]

$$y(t) = X_1(t) \otimes X_2^*(t) \otimes m_1(t) \otimes m_2^*(t) \quad \text{(Formula 9)}$$

Here, m_1(*t*) is a preamble sequence, and m_2(*t*) is a postamble sequence. Furthermore, an operator having a cross "x" in a circle represents a convolution operation. The value of m_pre(t) indicated by the following Formula 10 can be calculated in advance.

[Math. 10]

$$m_{pre}(t) = m_1(t) \otimes m_2^*(t) \quad \text{(Formula 10)}$$

In this case, Formula 9 can be transformed as the following Formula 11.

[Math. 11]

$$y(t) = X_1(t) \otimes X_2^*(t) \otimes m_{pre}(t) \quad \text{(Formula 11)}$$

The sections in which the correlation is calculated are limited to sections around the preamble and around the postamble. Therefore, the calculation amount can be reduced as compared with the first embodiment. In addition, similarly to the first embodiment, for the purpose of reducing the influence of phase noise and the like, calculation of amplitude values may be performed as illustrated in the following Formula 12.

[Math. 12]

$$y(t) = |X_1(t) \otimes m_1(t)| \otimes |X_2^*(t) \otimes m_2^*(t)|. \quad \text{(Formula 12)}$$

In addition, the calculation may be performed in the frequency domain.

[Math. 13]

$$y(t) = \mathcal{F}^{-1}\{\mathcal{F}(X_1(t)) \cdot \mathcal{F}(X_2^*(t)) \cdot \mathcal{F}(m_{pre}(t))\} \quad \text{(Formula 13)}$$

Here, F is a Fourier transform. The Fourier transform may be implemented by a fast Fourier transform (FFT). Such an implementation may be applied in the first embodiment. According to the implementation in the frequency domain, the calculation amount can be further reduced.

In addition, similarly to the first embodiment, for the purpose of reducing the influence of phase noise and the like, calculation may be performed as illustrated in the following Formula 14.

[Math. 14]

$$y(t) = \mathcal{F}^{-1}\left(\mathcal{F}\left(\left|\mathcal{F}^{-1}\{\mathcal{F}(X_1(t))\mathcal{F}(m_1(t))\}\right|\right)\mathcal{F}\left(\left|\mathcal{F}^{-1}\{\mathcal{F}(X_1(t))\mathcal{F}(m_2(t))\}\right|\right)\right) \quad \text{(Formula 14)}$$

The output of the synthetic correlator 118 may be the same value as the output of the slide correlator 115 of the first embodiment. Note that the peak detection unit 116 and the Doppler estimation unit 117 have the same configurations as each function with the same names in the first embodiment.

Figure 10:
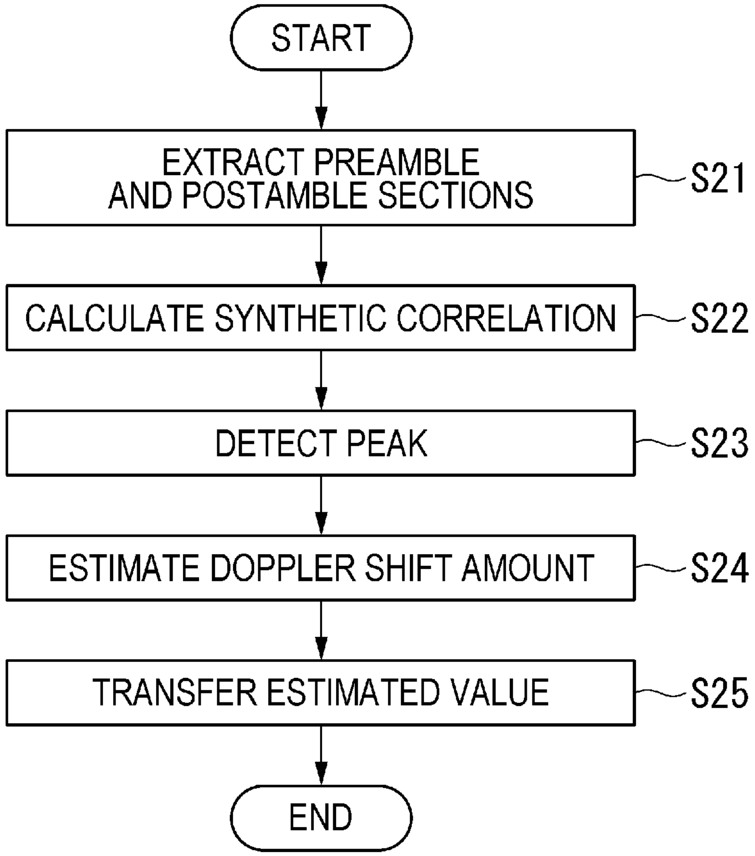
FIG. 10 is a flowchart illustrating a specific example of a processing flow of the estimation unit 11*b* of the second embodiment.

FIG. 10 is a flowchart illustrating a specific example of a processing flow of the estimation unit **11*b* of the second embodiment. Hereinafter, a specific example of processing of the estimation unit 11*b* of the second embodiment will be described with reference to FIG. 10. First, the preamble section extraction unit 114*b* extracts a section corresponding to the preamble. Furthermore, the synthetic correlator 118 extracts a section corresponding to the postamble (step S21). The synthetic correlator 118 calculates synthetic correlation of each section extracted in step S21 (step S22). The peak detection unit 116 detects the peak position T_max from the calculation result of the slide correlation (step S23). The Doppler estimation unit 117 estimates the Doppler shift amount (fd and γ) from the peak position T_max (step S24). The Doppler estimation unit 117 outputs the Doppler shift amount (fd and γ) which is the estimation result (step S25**).

Figure 11:
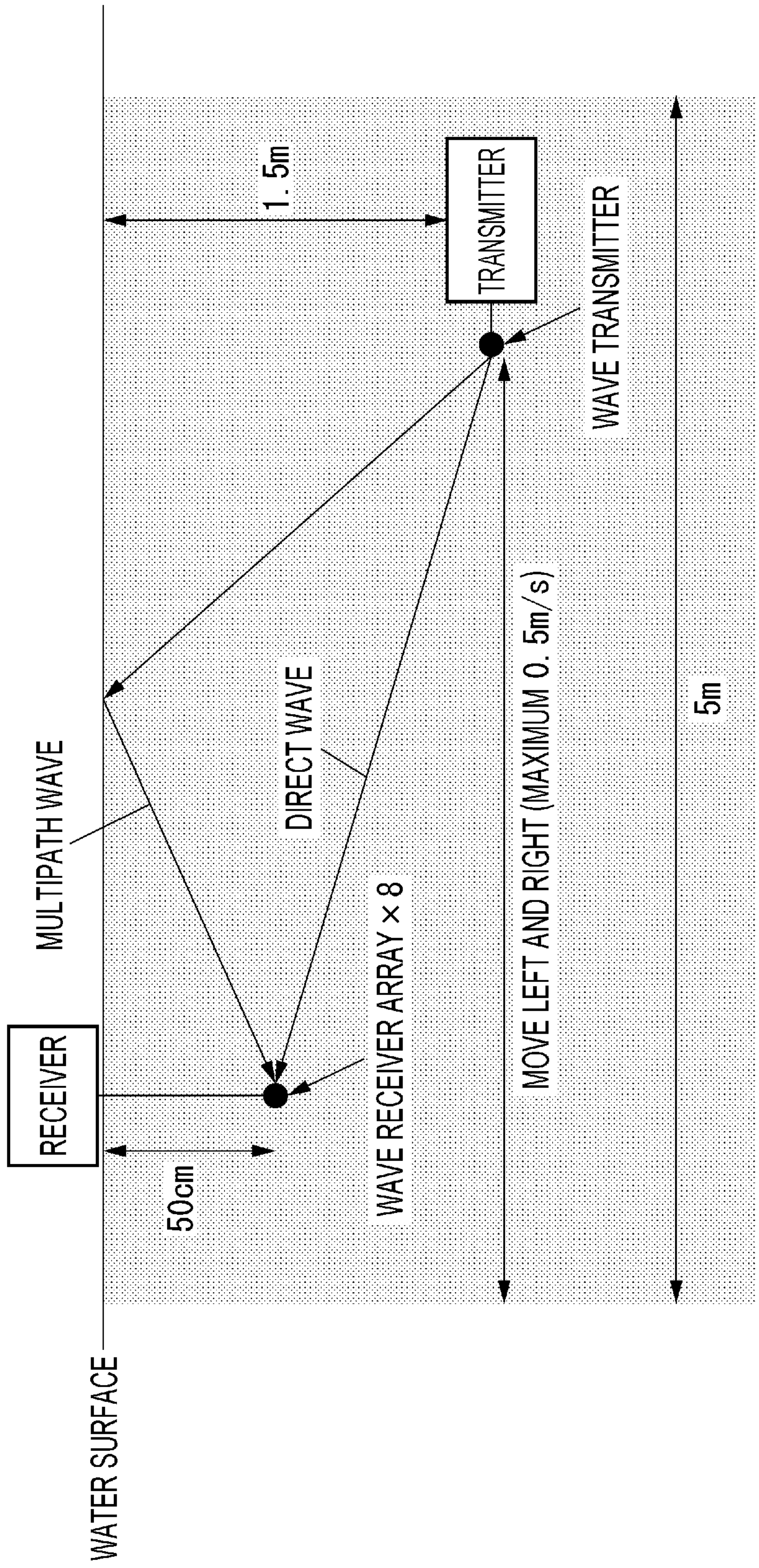
FIG. 11 is a diagram illustrating an environment of an experiment.
Figure 12:
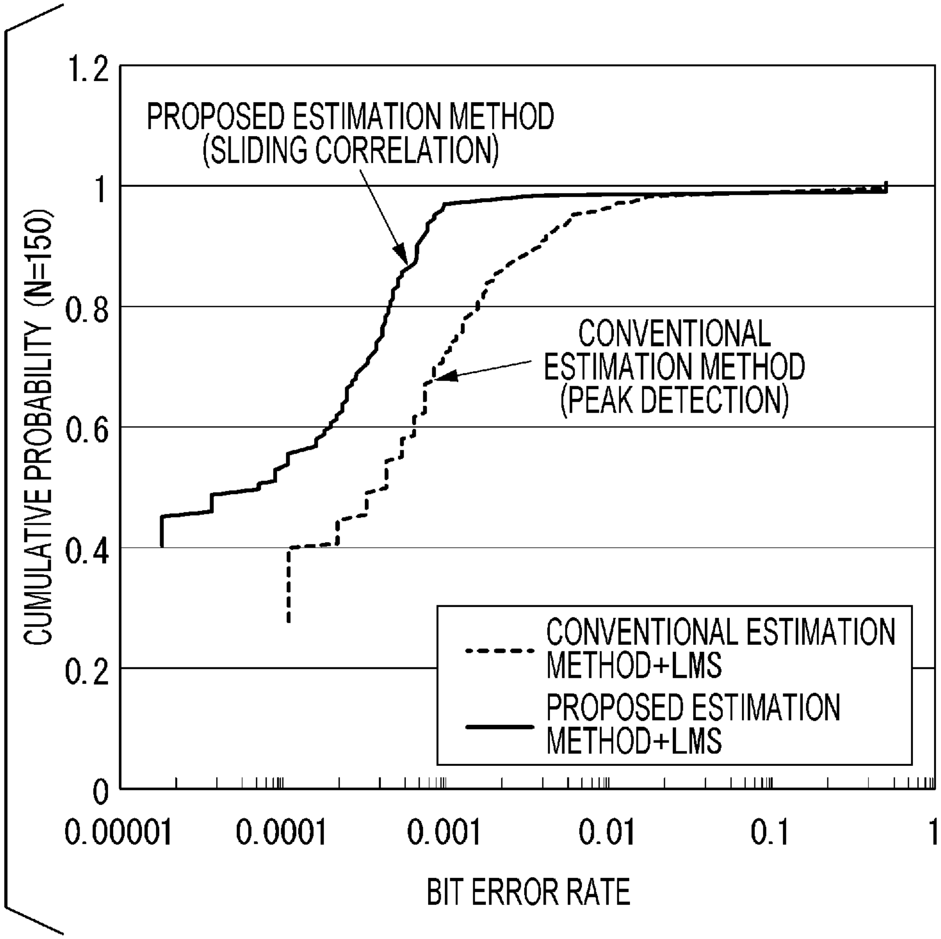
FIG. 12 is a diagram illustrating experimental specifications and experimental results.

Next, an experiment performed using a receiver to which the configuration of the present embodiment is applied will be described. FIG. 11 is a diagram illustrating an environment of an experiment. A moving environment with multipath in which the levels of reflected waves and direct waves are switched is reproduced in an anechoic water tank. This experiment confirms that the Doppler estimation of the present invention is more effective than the conventional method. In this experiment, sound waves are transmitted while the transmitter is moved left and right, and the sound waves are received by the wave receiver array. Doppler estimation (second embodiment) of the present invention and conventional Doppler estimation are performed for each reception channel, waveform equalization is performed, and then BER characteristics are evaluated. FIG. 12 is a diagram illustrating experimental specifications and experimental results. The graph illustrated in FIG. 12 shows the cumulative distribution function (CDF) of BER. This graph is created based on the BER when demodulation is performed on the same received data. The faster the rise of the curve, the better the average BER characteristics. Obviously, it can be seen that the estimation method of the present invention has better CDF characteristics than the conventional estimation method. Note that processing other than the Doppler estimation is the same between the estimation method of the present invention and the conventional estimation method. Therefore, it can be seen that the estimation method of the present invention has better characteristics than the conventional estimation method, and the Doppler can be accurately estimated in the multipath environment.

Figure 13:
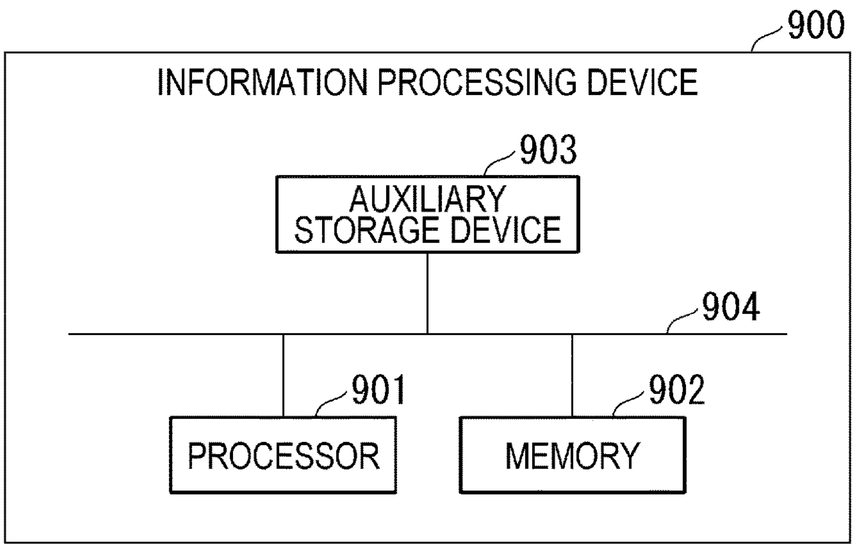
FIG. 13 is a schematic diagram illustrating a hardware configuration common to the estimation unit 11 of each embodiment.
Figure 14:
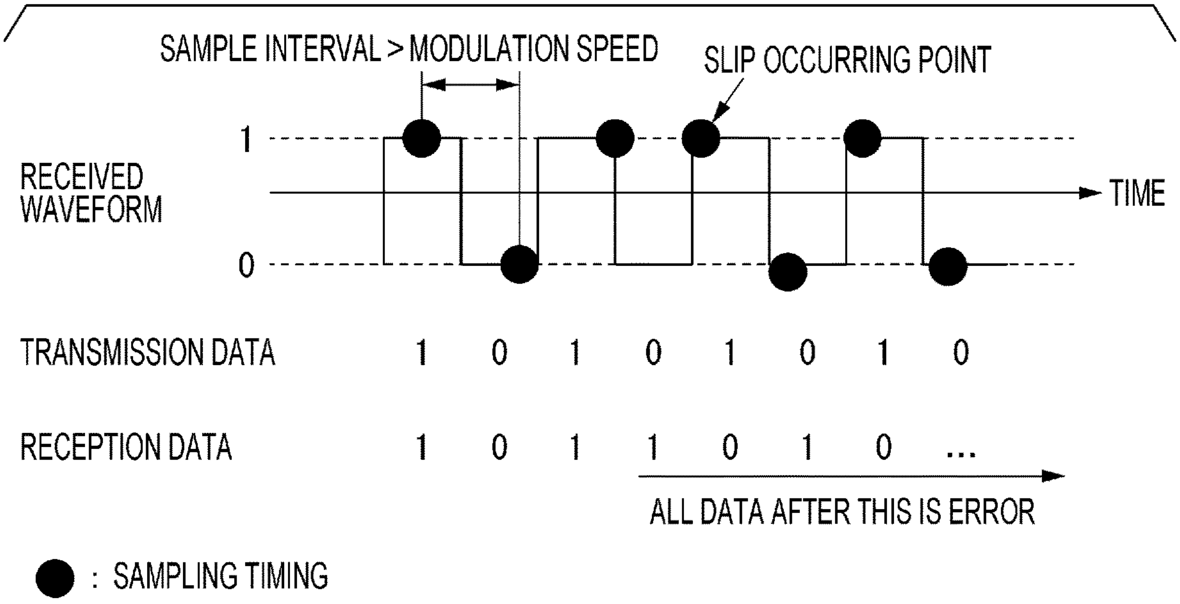
FIG. 14 is a diagram illustrating a specific example of burst errors due to slip.
Figure 15:
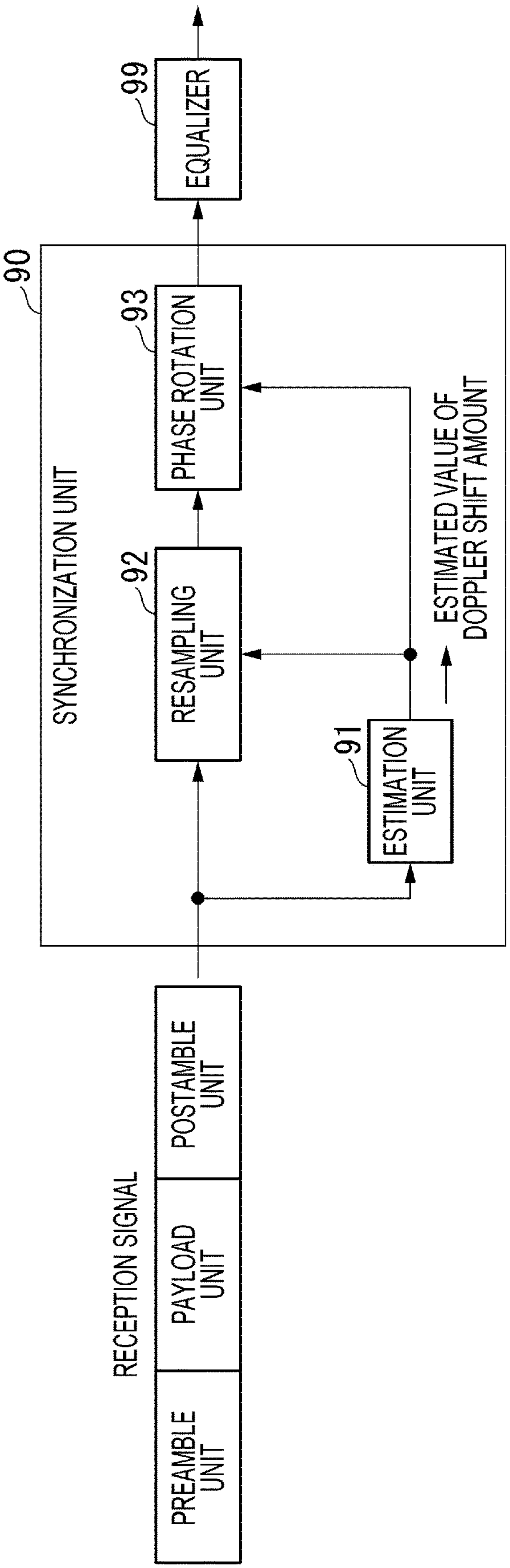
FIG. 15 is a diagram illustrating functional blocks of a conventional synchronization unit.
Figure 16:
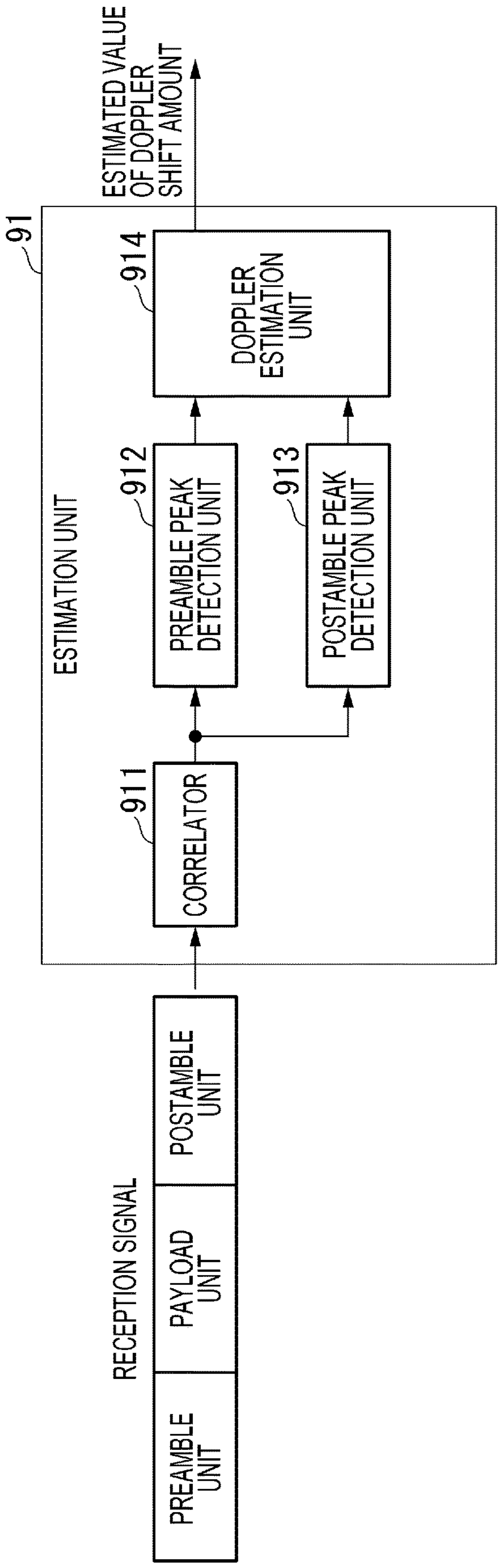
FIG. 16 is a diagram illustrating functional blocks of a conventional estimation unit 91.
Figure 17:
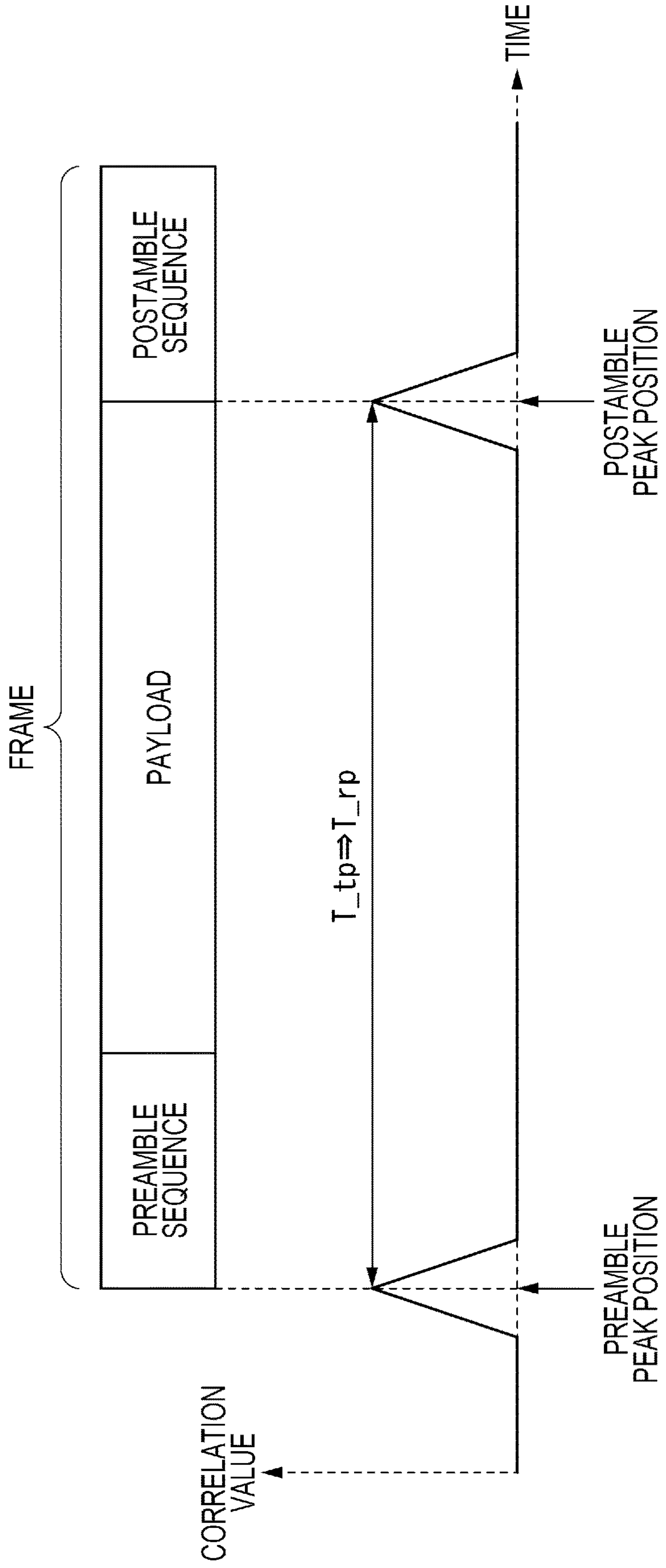
FIG. 17 is a diagram illustrating an outline of processing of the conventional estimation unit 91.
Figure 18:
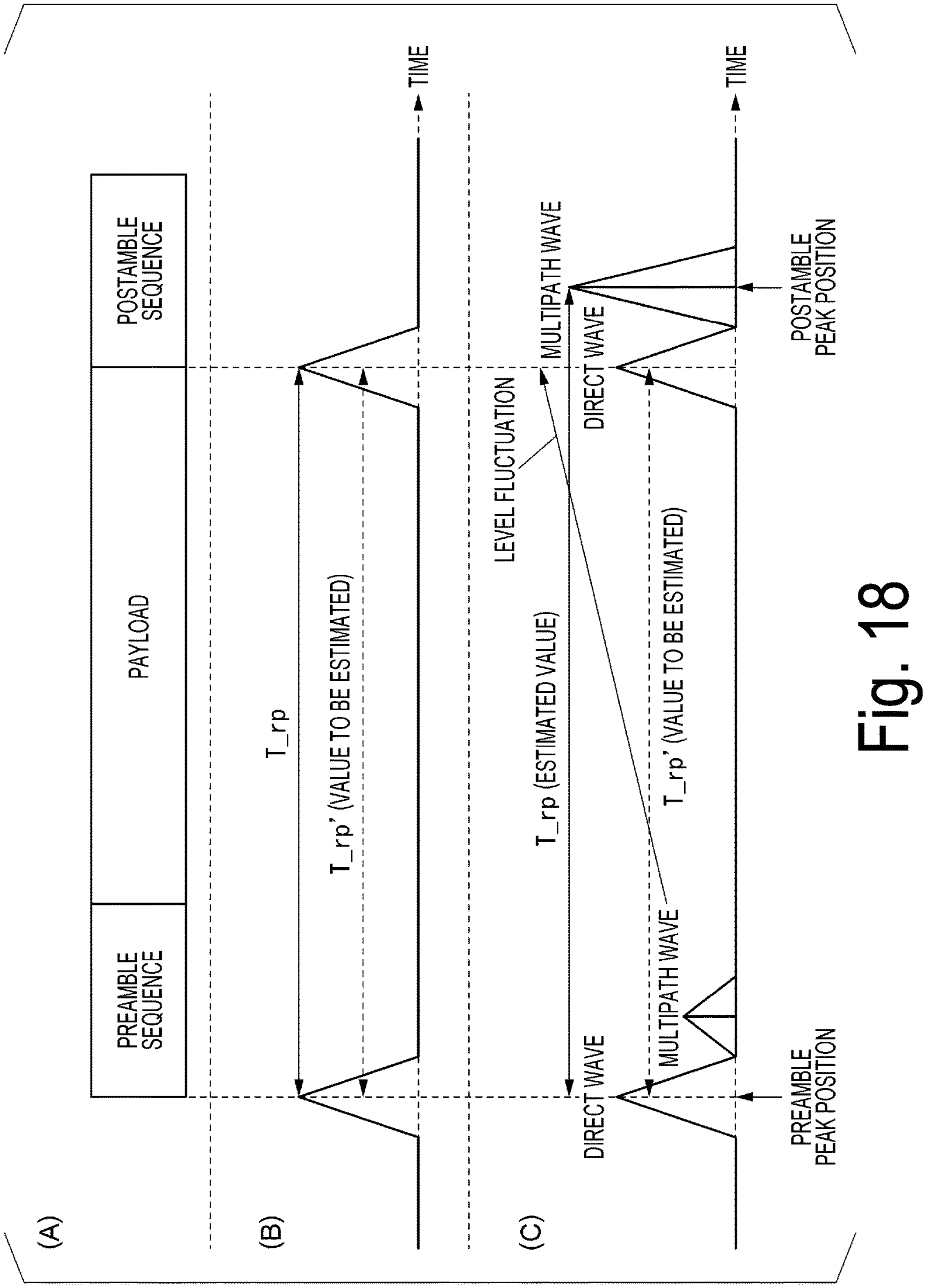
FIG. 18 is a diagram illustrating a specific example of a reception signal which is a processing target.

FIG. 13 is a schematic diagram illustrating a hardware configuration common to the estimation unit 11 of each embodiment. The estimation unit 11 may be configured using an information processing device 900 as illustrated in FIG. 13. The information processing device 900 includes a processor 901, a memory 902, and an auxiliary storage device 903. The processor 901, the memory 902, and the auxiliary storage device 903 are communicably connected via a bus 904. Some or all of the functions of the estimation unit 11 may be implemented using hardware such as an application specific integrated circuit (ASIC), a programmable logic device (PLD), or a field programmable gate array (FPGA).

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention is applicable to underwater communication.

REFERENCE SIGNS LIST

10 (Synchronizer)
11, 11*a*, 11*b* (Estimator)
12 (Resampler)
13 (Phase Rotator)
20 Equalizer
111 Correlator
112 First delay device
113 Second delay device
114*a*, 114*b* (Preamble Interval Extractor)
115 Slide correlator
116 (Peak Detector)
117 (Doppler Estimator)
118 Synthetic correlator

The invention claimed is:

1. A communication apparatus comprising:

a synchronizer configured to perform synchronization processing according to a Doppler shift on a reception signal; and an equalizer configured to perform equalization processing on a reception signal on which the synchronization processing has been performed, wherein the synchronizer includes a correlator configured to output a correlation between a reception signal and a known preamble sequence and a correlation between the reception signal and a known postamble sequence, a slide correlator configured to output a sliding correlation based on a correlation between a preamble sequence extracted from head of the reception signal and a known preamble sequence and a correlation between a postamble sequence extracted from end of the reception signal and a known postamble sequence output by the correlator, and a Doppler estimator configured to estimate a Doppler shift based on the sliding correlation of the slide correlator, wherein a delay amount output from the correlator to the slide correlator is calculated based on a waveform compression amount corresponding to a maximum assumed Doppler frequency.

2. The communication apparatus according to claim 1, wherein the slide correlator outputs a sliding correlation based on only amplitude information of an output of the correlator.

3. The communication apparatus according to claim 1, wherein the correlator and the slide correlator use a fast Fourier transform (FFT) for calculation of cross-correlation.

* * * * *